United States Patent [19]

Baba

[11] Patent Number: 4,782,404
[45] Date of Patent: Nov. 1, 1988

[54] POSITIONING SYSTEM FOR A DISC DRIVE USING A STEPPER MOTOR

[75] Inventor: Hiroshi Baba, Fujisawa, Japan

[73] Assignee: Mitsubishi Denki Kabushiki Kaisha, Japan

[21] Appl. No.: 38,488

[22] Filed: Apr. 13, 1987

Related U.S. Application Data

[63] Continuation of Ser. No. 673,517, Nov. 20, 1984, abandoned.

[30] Foreign Application Priority Data

Nov. 25, 1983 [JP] Japan .................. 58-221484

[51] Int. Cl.$^4$ .................. G11B 5/596; G11B 21/10
[52] U.S. Cl. .................. 360/77; 360/78; 318/634; 318/685
[58] Field of Search .................. 360/77, 78; 318/685, 318/696, 634

[56] References Cited

U.S. PATENT DOCUMENTS

| | | | |
|---|---|---|---|
| 3,534,344 | 10/1979 | Santana .................. | 360/77 |
| 4,122,503 | 10/1978 | Allan .................. | 360/78 |
| 4,136,365 | 1/1979 | Chick et al. .................. | 360/78 |
| 4,390,912 | 6/1983 | Hertrich et al. .................. | 360/78 |
| 4,396,959 | 8/1983 | Harrison et al. .................. | 360/77 |
| 4,419,701 | 12/1983 | Harrison et al. .................. | 360/77 |
| 4,453,188 | 6/1984 | Johnson et al. .................. | 360/78 |
| 4,513,332 | 4/1985 | Merritt et al. .................. | 360/77 |
| 4,516,177 | 5/1985 | Moon et al. .................. | 360/77 |
| 4,536,809 | 8/1985 | Sidman .................. | 360/77 |
| 4,685,007 | 8/1987 | Nazarian et al. .................. | 360/78 |

FOREIGN PATENT DOCUMENTS

2083926A 3/1982 United Kingdom .

OTHER PUBLICATIONS

IBM TDB vol. 20, No. 5, "Phase and Location Coded Servo Pattern for Controlling the Magnetic Head in Track Seek and Track Follow Operations", Schaller, 10/77, pp. 1792-1794.
IBM TDB, vol. 19, No. 6, "Self-Calibrating Disk Storage Apparatus", Griffiths et al., 11/76, pp. 1991-1992.
"Winchester Disks in Microcomputers", McLeod, Elsevier Science Publishers, 1983, pp. 154-157.
"HH-612 OEM Product Manual", Microscience International Corporation, Oct. 1983, Half-Height Winchester Disk Drive Part No. 1612-9001, pp. 5-17.
IBM Technical Disclosure Bulletin, vol. 20, No. 8, pp. 3243-3247, Jan. 1978.
IBM Technical Disclosure Bulletin, vol. 23, No. 2, pp. 738-742, Jul. 1980.
"Disc Drives", *Wireless World*, vol. 88, No. 1559 (1982), Sheepen Place, Olchester, Great Britain.

*Primary Examiner*—Raymond F. Cardillo
*Assistant Examiner*—Steven R. Garland
*Attorney, Agent, or Firm*—Leydig, Voit & Mayer

[57] ABSTRACT

A control system for positioning a head in a magnetic disk device. The control system including a stepping motor, an index timing sensor for indicating the starting point of a data track, a rectifier for rectifying the servo position information, and a envelope detector for detecting the envelope of the rectified servo information. The servo position information is recorded in at least two data tracks and is formed in a staggered, offset pattern. The outside and inside tracks can serve as reference tracks for use in predicting the expected position of an intermediate track between the reference tracks by the use of linear interpolation.

4 Claims, 6 Drawing Sheets

IDX POSITION $\bar{0}$ (a) INDEX SIGNAL T (b) RECTIFIED OUT E (c) AMPLITUDE F

POSITIONING SYSTEM FOR A DISC DRIVE USING A STEPPER MOTOR

This application is a continuation of application Ser. No. 673,517, filed Nov. 20, 1984 now abandoned.

BACKGROUND OF THE INVENTION

This invention relates to a positioning control device of a head. More particularly, it relates to positioning a head to a data track of a disk such as a magnetic disk device or an optical disk device and the likes.

In the below, a conventional magnetic head and a prior-art magnetic disk device are described in detail by way of examples in case of a head and a disk device as claimed.

Heretofore, a prior-art magnetic disk device of a memory used, for example, in a computer and the likes is configured as shown in FIG. 1. In FIG. 1, numeral 1 designates a magnetic disk, and information is recorded on tracks arranged concentrically at a predetermined interval. Numeral 2 designates a spindle motor for rotating the disk 1 at a predetermined speed. Numeral 3 designates a magnetic head for reading/writing information in the tracks of the disk 1. Numeral 4 designates an actuator for moving the head 3 by the drive force of a positioning stepping motor 5 (STM) to position the head 3 on an arbitrary track. Numeral 6 designates a base for fastening the motor 2, the actuator 4 and the motor 5. Numeral $7_{PA}$ designates an index sensor for detecting the index of the rotating section of the motor 2 and outputting an index signal at the beginning of a revolution.

The circuit arrangement of the magnetic disk device thus configurated as described above is now described by referring to FIG. 2.

In FIG. 2, numeral 8 designates a positioning control device (PCD) for outputting a drive signal B for rotating the motor 5 when receiving a head movement command signal A from a controller and outputting a positioning completion signal Z when the head 3 is completely moved to the track position where it is to be positioned. Numeral 9 designates a driving amplifier device (DAD) for amplifying the drive signal B, rotating the motor 5 by the drive power D and setting the stopping angle of the motor. Thus, the head 3 is positioned on the track of the disk 1. When the index sensor detects an index and the index detection signal is received by an external circuit (not shown), the head can read/write information on the corresponding track of the disk 1.

Environmental temperature varies and since the temperature expansion coefficients and the likes of the disk 1, the actuator 4 and the base 6 of the positioning control device of the prior-art disk apparatus are different from each other, the track on the disk 1 is relatively displaced from the position of the positioned head 3, an interference between the magnetisms produced by the adjacent tracks occurs, and the reliability in reading/writing information on the tracks by the head deteriorates. Such a problem creates difficulties in increasing the density of the track to increase the total number of tracks on the disk.

SUMMARY OF THE INVENTION

An object of this invention is to eliminate the above-mentioned disadvantages inherent in the prior-art disk device, and a further object is to provide a disk device which can compensate when positioning a magnetic head by using position information read from the head after positioning the head. This is achieved by writing position information for setting the head at a position normal to the radial direction of the data tracks of the head on a part of the data track.

Another object of the invention is to provide an index timing sensor having functions as a reference for timing for detecting the position information, and for indicating a reference for starting to operate factors (e.g., position information outputs $V_A$, $V_B$) to calculate the amount of positional displacement in addition to the function of the prior art index sensor which is used only to detect the index and to indicate the starting time for reading/writing data.

DESCRIPTION OF THE PREFERRED EMBODIMENTS

Figure 1:
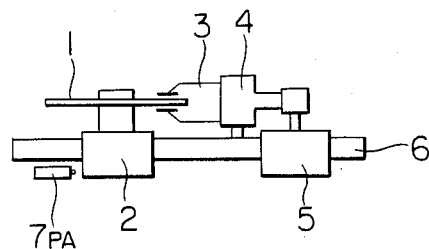
FIG. 1 is a mechanical view showing a prior-art magnetic disk device.
Figure 2:
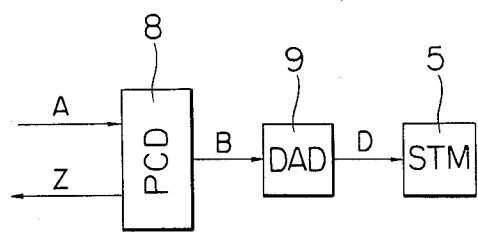
FIG. 2 is a block diagram showing a positioning control device of a magnetic head in a prior-art magnetic disk device.
Figure 3:
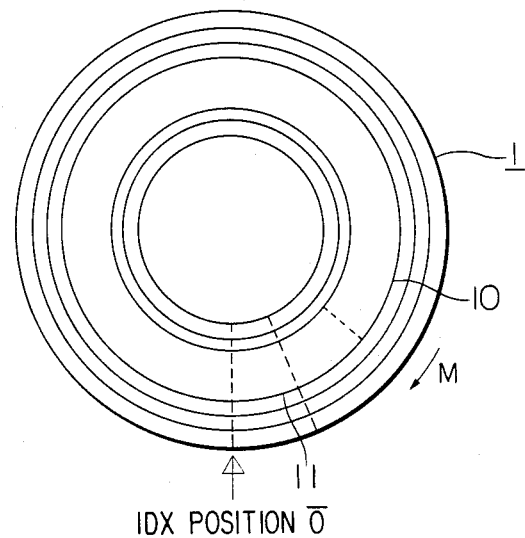
FIG. 3 is a view showing the configuration of an embodiment of a magnetic disk in accordance with the present invention.
Figure 4:
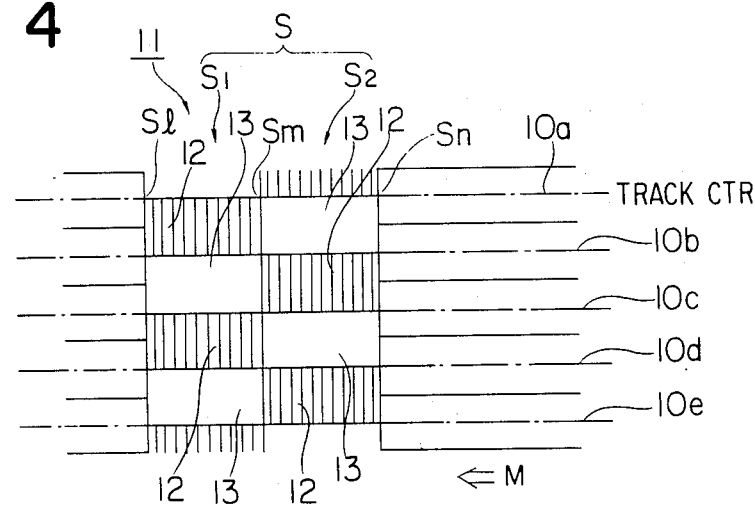
FIG. 4 is a view showing the configuration of position information areas.
Figure 5:
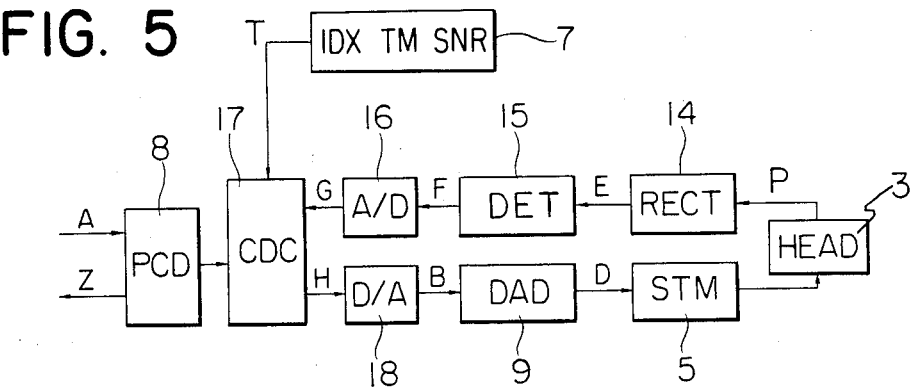
FIG. 5 is a block diagram showing another embodiment of a positioning control device of a magnetic disk device according to the present invention.

FIGS. 3 through 5 illustrate an embodiment of a positioning control device of a magnetic head in accordance with the present invention, wherein the same symbols in FIGS. 1 and 2 denote the same parts. In FIGS. 3 to 5, numeral 10 designates data tracks, which are formed concentrically on a magnetic disk 1 for recording/reproducing data, and formed as 10a through 10e as shown in FIG. 4. Numeral 11 designates position information areas including position information S started from the index (IDX) position $\overline{O}$. The position information S includes has first position information S1 and second position information S2 in the form of alternatively disposed flux-reversal areas 12 and non-flux-reversal areas 13 radially and laterally in parallel as shown in FIG. 4. In this case, while the flux-reversal areas 12 of the first position information S1 correspond to the non-flux-reversal areas 13 of the second position information S2, the areas 12 and 13 of the information S1, S2 have the same interval as the data tracks 10a to 10e but are displaced by half pitch to the data tracks. In FIG. 5, numeral 14 designates a rectifier (RECT) for outputting an output E produced by rectifying the position information P outputted from the head 3. Numeral 15 designates an integrator (INTG) for integrating the rectified output E and outputting an amplitude F of the position information. Numeral 16 designates an analog digital converter (A/D) for digitizing the amplitude F and outputting the digitized position information G. Numeral 17 designates a control device for compensating position displacement (CDC) by detecting the position displacement from the position information G to produce a position compensating output H. Numeral 18 designates a digital analog converter (D/A) for analogously converting an electric current supplied to the stepping motor 5 by the position compensating output H. An index timing signal T outputted from an index timing sensor (IDX TM SNR) 7 provides the start timing of the position information area 11 to the control device 17.

Figure 6:
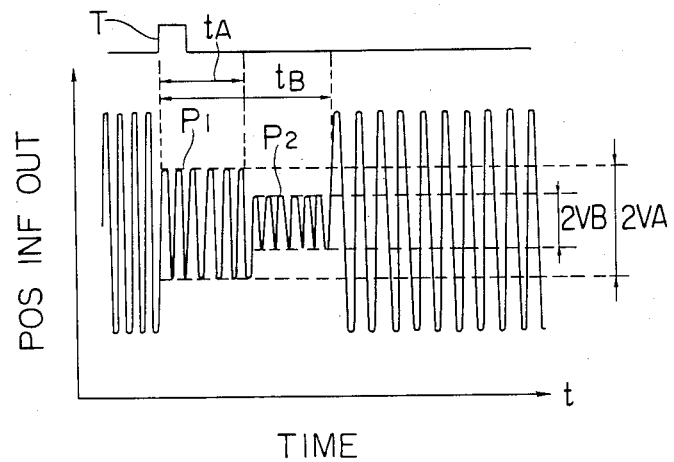
FIG. 6 is a waveform diagram showing the varied state of the position information output to a time.
Figure 7:
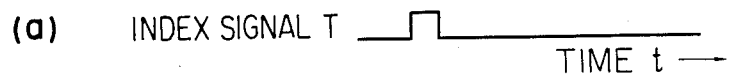
FIGS. 7(a) through 7(c) are waveform diagrams showing waveforms of processed rectified outputs.
Figure 7:
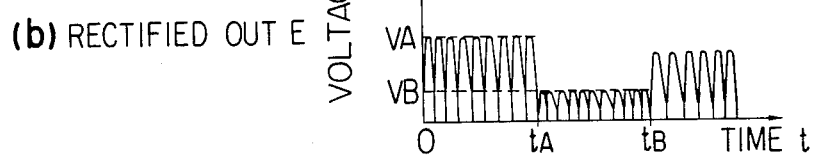
Figure 7:
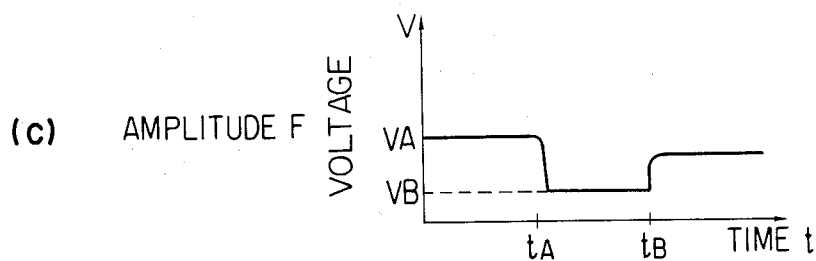

The operation of the positioning control device of a magnetic head configurated as described above is now described by referring to the characteristic diagrams of FIGS. 4 to 9. Assume that the disk 1 rotates in a direction by an arrow M. When a head movement command signal A is received from a controller, the head is not disposed on the track. Namely, it is not accordingly necessary to compensate the position displacement of the head. This signal A is converted into the drive signal B including no position compensation of the motor 5 through the control device 17 and the D/A converter 18. When the signal A is fed to the motor, the head is moved into the arbitrary track through the actuator by the rotation of the positioning device. The position compensation may be executed. The compensation sequence is now described. The index timing signal T is outputted once from the index timing sensor 7 whenever the disk 1 is rotated by one revolution to detect the index. Then, the position information output P is outputted from the head 3. The position information output P has, as shown in FIG. 6, a voltage output P1 (2VA) corresponding to the first position information S1 and a voltage output P2 (2VB) corresponding to the second position information S2, fed to the rectifier 14, in which the voltage outputs P1 and P2 respectively become voltage outputs corresponding to times $t_A$ and $t_B$ from the index timing signal T. The time $t_A$ is an arrival time of the head 3 from the start point Sl of the first position information S1 to the end point Sm, and the time $t_B$ is an arrival time of the head 3 from the start point Sl of the first position information S1 to the end point Sn of the second position information S2. The voltages VA and VB are the maximum and the minimum amplitude output voltages of the head 3, respectively. The position information output P is processed, as shown in FIGS. 7(b) and 7(c), by the rectifier 14 and the envelope detector 15, and further digitally converted by the A/D converter 16. The control device 17 samples the digitally converted position information output during each period of the times t from the index timing signal of $0 < t < t_A$ and $t_A < t < t_B$ as input thereof sequentially.

Figure 8:
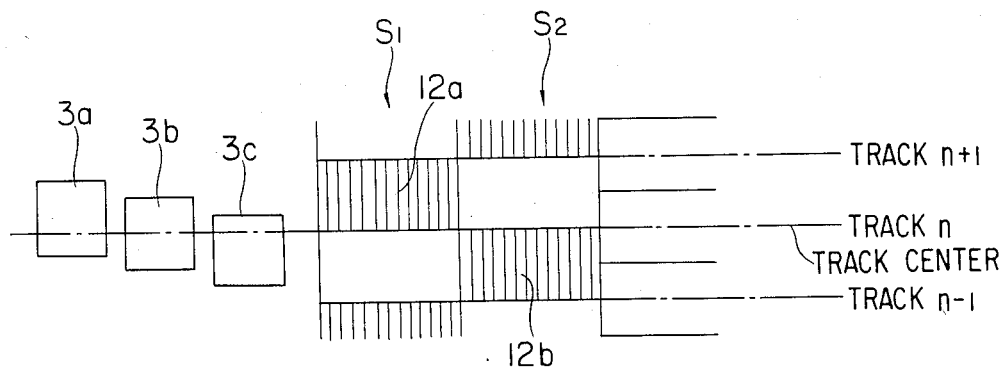
FIG. 8 is a view showing the position displaced state of the magnetic head.
Figure 9:
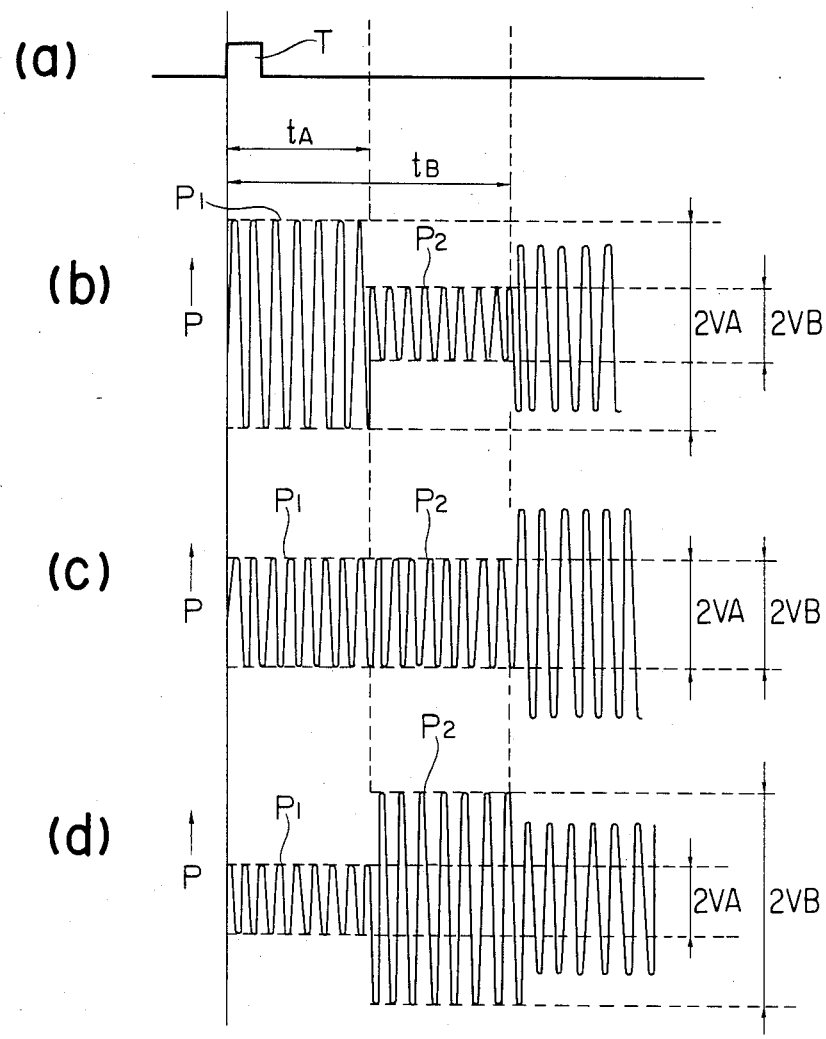
FIG. 9, consisting of FIGS. 9(a)–9(d) and 10 are waveform diagrams showing the states of varied position information outputs to the position of the magnetic head.

On the other hand, the position information output P is proportional to the corresponding area of the flux-reversal areas 12 of the first and second position information S1, S2 read by the head 3. Therefore, the variation in the position information output P corresponding to the positions 3a, 3b, 3c of the head 3, as shown in FIG. 8 becomes as shown in FIGS. 9(b), 9(c), 9(d). As is apparent from FIG. 9, when the head 3 is accurately positioned at the position 3b to the center of the n'th track, the head 3b is affected by the equivalent influence from the flux-reversal areas 12a of the first position information S1 and the flux-reversal areas 12b of the second position information S2. Thus, as shown in FIG. 9(c), the outputs P1 and P2 become of equal value, and the output P becomes constant. On the other hand, when the head 3 is disposed at the position 3b displaced toward the adjacent n+1 track side to the n track, the head 3 is more strongly affected by the influence from the flux-reversal areas 12i a. Thus, as shown in FIG. 9(b), the output P1 becomes larger than the output P2. When the head 3 is disposed at the position 3c displaced toward the adjacent n−1 track side to the n track, the head 3 is more strongly affected by the influence of the flux-reversal areas 12b. Thus, as shown in FIG. 9(d), the output P2 becomes larger than the output P1. The position of the head to the n track can be discriminated by observing the magnitudes of the outputs P1 and P2.

Figure 10:
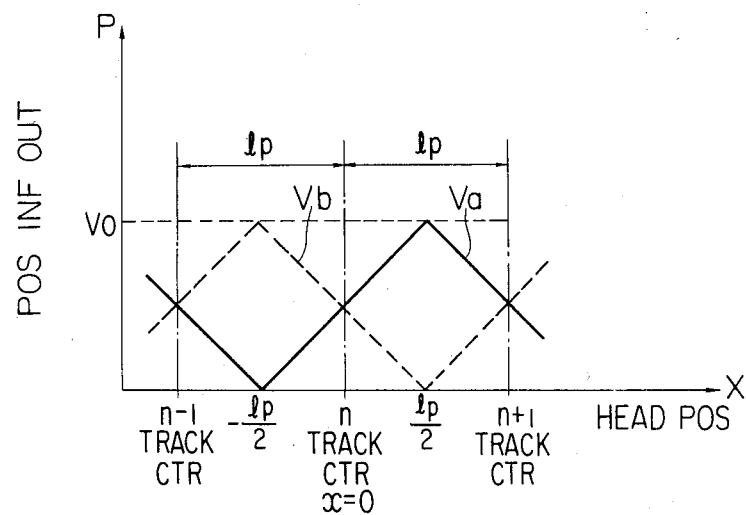

If the amount of position displacement from the center of the track is indicated by X, the track pitch (the distance between the center lines of adjacent tracks) is indicated by IP, the maximum output voltage is indicated by $\overline{Vo}$, the output voltage corresponding to the first position information S1 of the head is indicated by Va, and the output voltage corresponding to the second position information S2 is indicated by Vb, the characteristic shown in FIG. 10 can be described as below.

For FIG. 10, in the range $$-IP/2 < X < IP/2,$$

$$Va = (\overline{Vo}/IP)X + Vo/2 \qquad (1)$$

$$Vb = -(\overline{Vo}/IP)X + Vo/2 \qquad (2)$$

are obtained.

From the equations (1) and (2), $$Va - Vb = 2(\overline{Vo}/IP)X \qquad (3)$$

can be obtained. Then, the position displacement X can be represented by $$X = \{(IP/2\overline{Vo})(Va - Vb)\} \qquad (4)$$

On the other hand, the value of Va+Vb becomes from the equations (1) and (2)

$$Va + Vb = \overline{Vo} \qquad (5)$$

When the equation (5) is substituted into equation (4), the position displacement X can be represented by $$X = (Ip \cdot (Va - Vb)/2 \cdot (Va + Vb)) \qquad (6)$$

The equation (6) indicates that, when the track pitch IP is known, the displacing direction and the amount of position displacement from the center of the track of the head 3 can be calculated by using the position information outputs Va, Vb.

For example, assuming that the track pitch PP=100 microns, the output voltage Va=3 V and the output voltage Vb=1 V, from equation (6), $$X = \{100 \times (3-1)/2 \times (3+1)\} = 25$$

Thus, the position of the head can be detected to be displaced by 25 microns toward the n+1 track. The relationship between the displacing direction and the polarity of X is inverted for every track, but it may be readily discriminated whether the track number is even or odd, as the track pitch IP is generally known. As described above, when equation (6) is evaluated with the position information output voltages Va, Vb by the control device 17, the position displacement of the head 3 can be calculated.

The control device 17 can further compensate for the position displacement of the head 3 that is detected as described above so that the said displacement approximately is zero.

The stopping angle of the stepping motor is generally determined by the combination of the excitation phases. It is known that, when the current values supplied to the phases are varied, the stopping angle can be finely controlled. This is called a microstep or a vernier drive. According to the invention, the position displacement of the head 3 can be compensated by finely varying the stopping angle of the stepping motor 5, by altering the interphase current of the motor 5 as result of changing the input of the D/A converter 18 by means of the control device 17.

Figure 11:
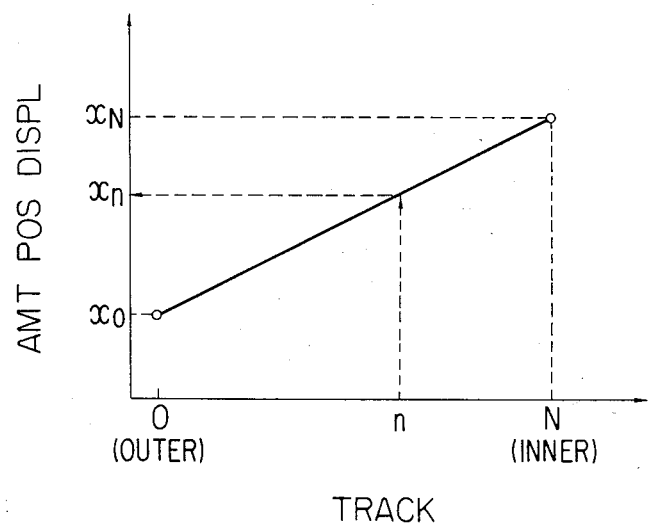
FIG. 11 is a graph showing the characteristic for presuming the amount of the displaced positions of the tracks from the displaced position of the inner and outer tracks according to still another embodiment of the present invention.
Figure 12:
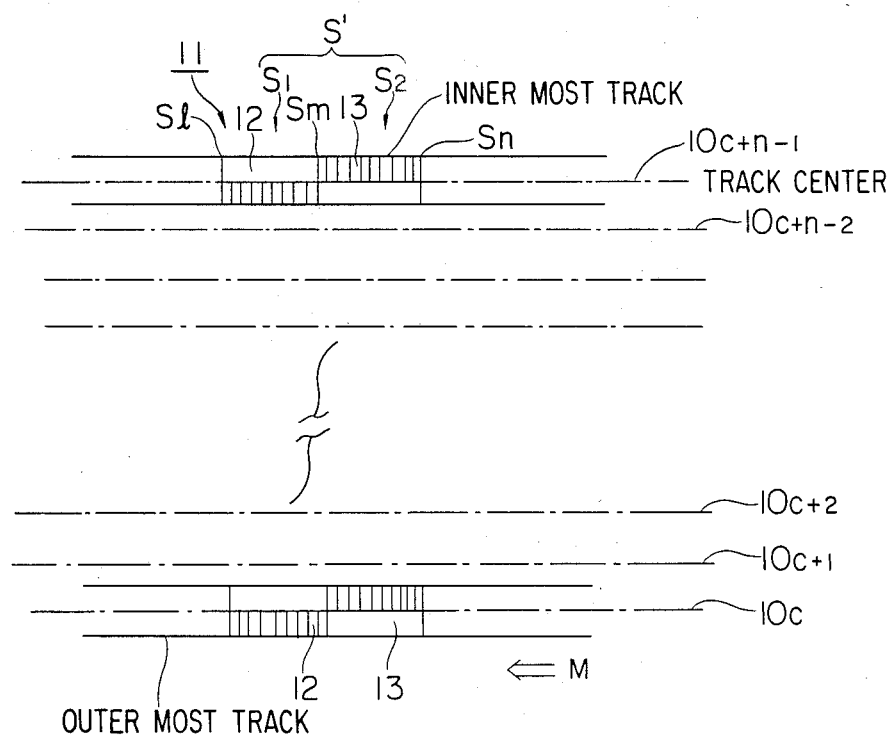
FIG. 12 is a view of the configuration showing the position information areas of the case that the both end sides are most inner and outer sides in accordance with the embodiment shown in FIG. 11.

Another embodiment of the invention is now described by referring to FIG. 12. This is the case that the position information is provided only on the inner and outer most tracks ($10_c$, $10_{c+n-1}$, . . . , indicating the center of the respective tracks). In other words, the positions of the inner and outer most tracks are detected and memorized on the basis of the position information provided on the inner and outer most tracks. It is noted that the presumed position displacement means provides the position displacement of a track which is intermediate the innermost and outermost tracks by linear approximation from the detected positions, as illustrated by the characteristic curve shown in FIG. 11. The head can be positioned in advance to the presumed position of an intermediate track by utilizing the output of one of the presumed position means displacement. According to this method, the time period required for compensation can be shortened.

In the embodiments described above, the control device 8 and the control device 17 are separately provided. However, these devices may be summarized in a microcomputer.

In the embodiments described above, the magnetic disk apparatus driven by a stepping motor has been described. However, the invention may also be applied to a magnetic disk device driven by a voice coil, an optical disk device or a laser disk apparatus.

From the foregoing description it is seen that the configuration according to the positioning control device, of the magnetic head of the present invention, as described above, provides a method for applying positioning information to a part of the data tracks and compensating the positioning of the head for enviromental change. Therefore, the relative position displacement between the data track and the magnetic head due to the variation in the environmental temperature can be minimized, thereby improving the systems reliability.

Furthermore, high track density can be achieved at lower cost.

What is claimed is:

1. A control system for positioning a head for reading/writing information from one of a plurality of data tracks formed on a disk along concentric center-lines comprising:
   a disk drive motor including a rotary unit having an index,
   position displacement compensating control means,
   an index timing sensor for detecting an index at every revolution of said drive motor, the index representing a starting point of a data track extension having a position information recocrding area, and for feeding an index signal to said position displacement compensating control means,
   position information means provided in the form of alternately disposed magnetic flux-reversal areas and non-flux-reversal areas recorded over predetermined radial areas of predetermined data tracks on the disk and having predetermined patterns arranged offset from a center-line of each data track and in a staggered sequence and within the extension of each data track for generating consecutive respective position representing signals via a magnetic head in accordance with the position displacement of the head from the center-line of the track,
   operating means for detecting the respective position representing signals from said position information means as respective analog signals,
   rectifying and envelope-detecting means for rectifying the respective analog signals and detecting the envelopes thereof to provide respective analog position signals representing by their respective magntiude the amount of the position displacement of the head in one lateral direction or in the opposite lateral direction, respectively, from the center-line of the track,
   said operating means including a stepping motor for moving the head in a direction crossing the extension of the data track and having a stopping angle which is finely controlled by a combination of excitation phases supplied to the stepping motor,
   A/D converter means for converting respective analog position signals to digital position signals,
   said position displacement compensating control means including means for inputting the digital position signals in coincidence with the index signals from said index timing sensor, and for calculating the compensating dispalcement and direction of displacement required to position the head on the center-line of the track and producing a digital output representing the required compensating displacement and direction of displacement, and
   means for converting the digital output to a corresponding analog output in the form of a combiantion of excitation phases supplied to said stepping motor and for feeding the analog output as a position compensating output for controlling said stepping motor to move the head to the center-line of the track.

2. A disk device as claimed in claim 1 wherein said operating means comprises an actuator.

3. A disk device as claimed in claim 1 wherein the flux-reversal and non-flux-reversal areas have a pitch equal to the interval between the center-line of adjacent data tracks, have center-lines respectively displaced from the data track center-lines by half pitch of the interval between center-lines of adjacent data tracks on both sides of each data track, and the areas are displaced longitudinally so as not to overlap each other.

4. A control system for positioning a head for reading/writing information from one data track of a plurality of data tracks concentrically formed on a disk comprising:

a disk drive motor including a rotary unit having an index, presumed position displacement means, an index timing sensor for detecting the index at every revolution of said drive motor, the index representing a starting point of a data track extension having a position information recording area, and for feeding an index signal to said presumed position displacement means, rectifying and envelope-detecting means, alternately disposed magnetic flux-reversal areas and non-flux-reversal areas recorded over predetermined radial areas on the disk and having predetermined patterns arranged offset from a center-line and in a staggered sequence and within the extension of each of two data tracks spaced from each other by a plurality of other data tracks and generating consecutive respective position representing signals via a head in accordance with the position displacement of the head from the center-line of each of the two spaced data tracks, means connected to the head for detecting the magnetic flux-reversal areas and feeding analog signals to said rectifying and envelope-detecting means to provide analog position signals representing by their magnitude the amount of the position displacement of the head from the center-line of each of the two spaced tracks, said presumed position displacement means including means for memorizing the positions of the two spaced data tracks on the basis of the analog position siganls and for outputting presumed position displacement of a track which is intermediate the two spaced data tracks on the basis of linear approximation from the memorized positions, and operating means including a stepping motor for moving the head in a direction crossing each of the data tracks and for positioning the head at the intermediate track in accordance with the presumed position dispalcement of the intermediate track.

* * * * *